July 4, 1933.  N. H. CURTISS  1,916,361
METHOD AND APPARATUS FOR STRIPPING HOSE FROM MANDRELS
Filed Aug. 10, 1931  2 Sheets-Sheet 1

INVENTOR
NATHANIEL H. CURTISS
BY
ATTORNEY

July 4, 1933.  N. H. CURTISS  1,916,361

METHOD AND APPARATUS FOR STRIPPING HOSE FROM MANDRELS

Filed Aug. 10, 1931  2 Sheets-Sheet 2

INVENTOR
NATHANIEL H. CURTISS
BY
ATTORNEY

Patented July 4, 1933

1,916,361

UNITED STATES PATENT OFFICE

NATHANIEL H. CURTISS, OF PASSAIC, NEW JERSEY, ASSIGNOR TO NEW YORK BELTING AND PACKING COMPANY, OF NEW YORK, N. Y., A CORPORATION OF NEW YORK

METHOD AND APPARATUS FOR STRIPPING HOSE FROM MANDRELS

Application filed August 10, 1931. Serial No. 556,075.

My present invention relates to the manufacture of hose and more particularly to an improved machine for stripping hose from the mandrel on which it has been manufactured.

In the manufacture of composite rubber and fabric hose or rubber and fabric and metal armored hose, it has heretofore been the practice to manually remove the mandrel from the hose. Such hose is ordinarily built in approximately 50 foot lengths, as such length has been found to be the most practical from a manufacturing standpoint. The operation of manually removing the mandrel from such a length of hose requires a minimum of five men and in performing this operation the end of the mandrel is clamped in a vice, the men distribute themselves along the length of the hose and manually work the same loose from the mandrel. It has heretofore been attempted to break the hose loose from the mandrel by air pressure in order to expedite the removal of the mandrel therefrom, but the hole in the hose is so small, relatively speaking, and the enclosing hose clasps the mandrel so tightly that no amount of available pressure was sufficient to break through.

In making hose, a mandrel of smooth metal is employed, the diameter of the mandrel corresponding to the size of the aperture through the center of the completed hose. Preferably the mandrel is covered with a thin coating of black lead and over the mandrel is placed a rubber tube of approximately 30 feet in length. The diameter of this tube is large enough to enable the tube to be easily drawn over the mandrel. The tube and mandrel are then run through a braiding machine which weaves a double strand jacket around the outside of the rubber tube. Approximately five pounds tension is exerted on each strand and, as it winds the tube very tight, the tube elongates in the braiding process and at the completion of such process reaches a length of about 50 feet. In other words the tube with its cover of braid thereon completely covers the mandrel. The tube with its covering of braid may have placed thereon a second tubular member which acts as a covering for the braid and over such second covering is placed a second layer of braiding and as many alternate layers of braiding and rubber may be placed on the hose as may be desired. After the hose leaves the braiders, it is preferably run through a latex bath, after which a cloth wrapper is applied and the hose is then sent to the vulcanizer and cured. The cloth wrapper, which is wrapped around the hose for the purpose of producing the necessary pressure while the hose is being vulcanized, is removed after the hose comes from the vulcanizers, and the hose is then ready for stripping. The hose may be manufactured in a number of different methods other than that described above, but if built on a mandrel, and this is the usual way, the hose grips the mandrel very tightly and heretofore it has been extremely difficult to successfully and economically strip the hose from the mandrel. In spite of the coating of black lead or graphite on the mandrel, the inner tube of the hose adheres to the mandrel to some extent and must be broken away therefrom before the mandrel can be withdrawn. Hand labor is very expensive and the present invention is designed to avoid the necessity for the use of hand labor in this particular operation.

In my present invention, I have obviated the objections to prior methods of stripping hose from mandrels and have devised a machine in which the operation is mechanically performed. In carrying out my invention, I have devised a machine for mechanically breaking the hose from the mandrel and then mechanically holding the hose throughout its entire length, while mechanically withdrawing the mandrel therefrom.

The object of my invention, therefore, is an improved method of apparatus for stripping hose from a mandrel during the manufacture thereof.

In the accompanying drawings illustrating a preferred embodiment of my invention;

Figure 1:
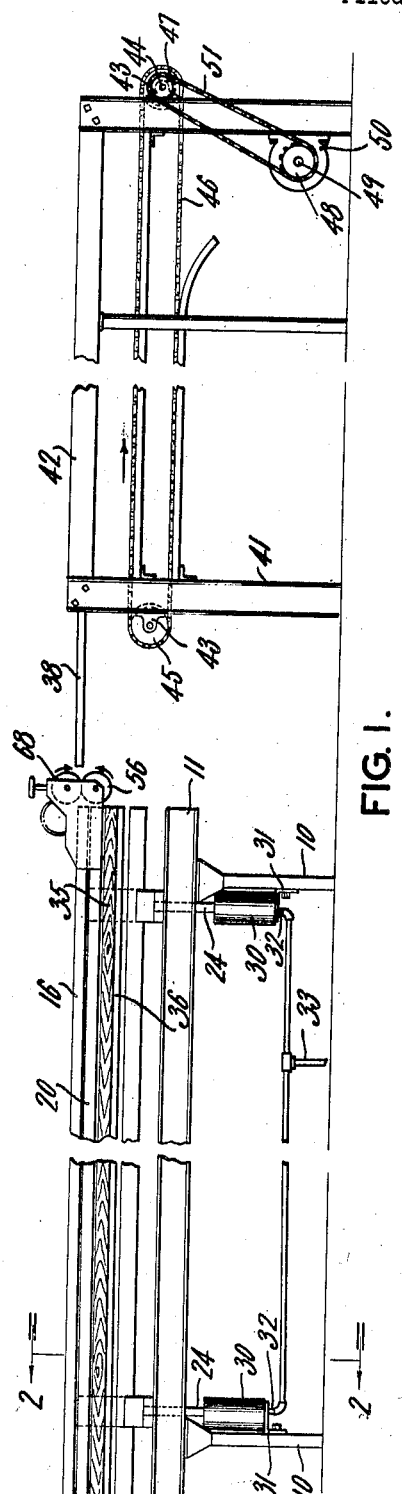
Figure 1 is a side elevation.
Figure 6:
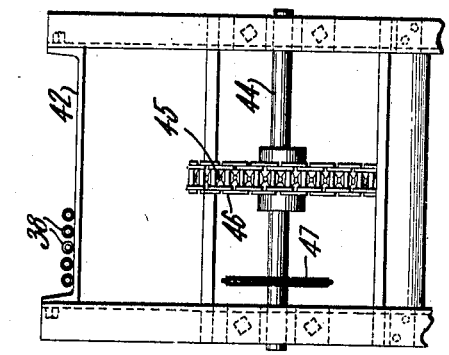
Figure 5:
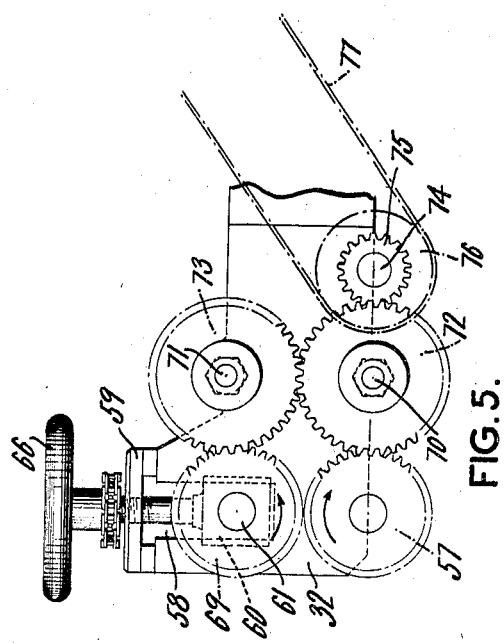
Figure 4:
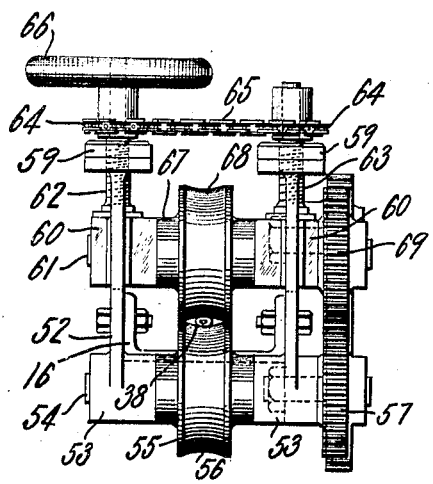
Figure 7:
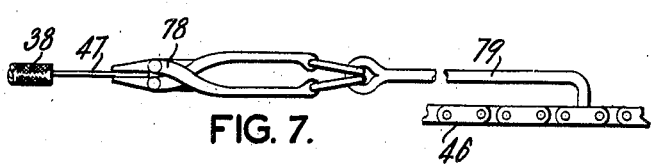

Fig. 4 is an end view of the breaker rolls;

Fig. 5 is a side elevation thereof;

Fig. 6 is an end view of the upper portion of the right-hand end of Fig. 1;

Fig. 7 is a detail of the drawing chain and clamping means for grasping the mandrel.

Figure 3:
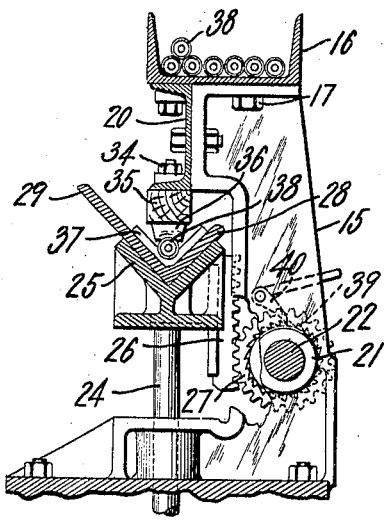
Fig. 3 is a sectional view on the line 2—2 of Fig. 1 and showing the clamping means in closed position.
Figure 2:
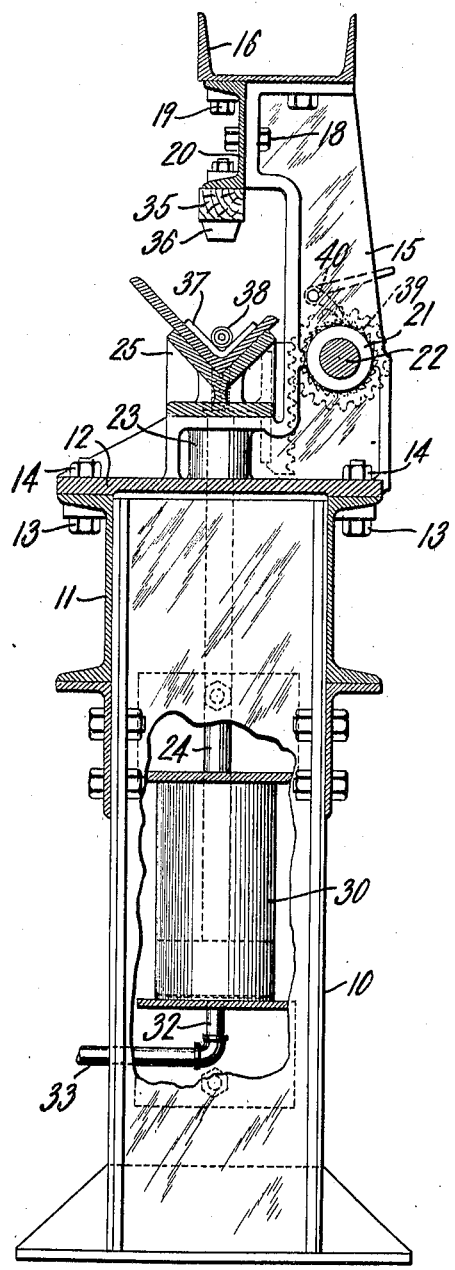
Fig. 2 is a section on the line 2—2 of Fig. 1, and showing the clamping means open.

Referring to the drawings, 10 designates standards to the upper end of which is secured a rectangular framework 11 and to the top of the framework 11 is secured a table or plate 12. The framework 11 is of any appropriate length and as the hose is built in fifty foot lengths, I have found that a length of 52 to 53 feet for the framework 11 is sufficient. Secured to the top or plate 12 by bolts 13 and nuts 14, and as upward continuations of the pedestals 10, are standards 15. These standards are spaced apart from and are secured to each other by a channel iron 16, such channel iron being secured to the standards 15 by bolts 17. Also secured to the standards 15 and to the channel iron 16, by bolts 18 and 19, respectively, is a channel iron 20. The length of the channel irons 16 and 20 is approximately equal to the length of the frame members 11. Journalled in bearings 21 formed in the uprights 15 and lying parallel to the table or platform 12 is a shaft 22. Formed as an integral part of the standards 15 and immediately below the channel iron 20 are vertical bearing members 23 and in each of these bearing members is slidably mounted a shaft or piston rod 24. The upper surfaces of each of the bearing members 23 lie in the same horizontal plane and normally resting thereon are angle supports 25, the lower end of the angle supports 25 being secured to the upper end of the shafts or piston rods 24. Secured to or formed integral with the V-supports 25 are vertically arranged racks 26, which mesh with and are driven by pinions 27 secured to the shaft 22. Secured in the angle of each of the angular members and of a length substantially equal to the length of the framework 11 or angle irons 16 and 20 is an L-shaped member having a short leg 28 and a long leg 29. The shafts or piston rods 24 are each connected to a piston working in cylinders 30 attached to the uprights 10 by brackets 31. Each of the cylinders 30 are connected by pipe 32 to a pipe line 33, leading to any convenient source of fluid pressure (not shown). When fluid pressure such as air pressure is applied to the cylinders 30, it is obvious that the shafts or piston rods 24 will be moved upwardly carrying with them the L-shaped member on the angle supports 25, and because of the fact that the racks 26 mesh with the pinions 27 on the shafts 22, it is assured the L-shaped member will be maintained in a horizontal position throughout its entire movement. By releasing the fluid pressure in the pipe line 33, it is obvious that the L-shaped member on the angle supports 25 will be lowered from the position shown in Fig. 3 to the position shown in Fig. 2. Secured to the channel iron 20 by bolts 34 is a member 35 preferably of wood and which extends throughout the length of the L-shaped member carried on the angle supports 25. To the under face of this member 35 is secured in any convenient manner a sponge rubber member 36, which is also of a length substantially equal to the length of the L-shaped member on the angle supports 25. The L-shaped member is provided with a member 37, preferably of soft rubber and which conforms to the angular surface of the L-shaped member as clearly shown in Figs. 2 and 3. When fluid under pressure is admitted to the cylinders 30, it is obvious that the angle brackets 25 will be moved upwardly from the positions shown in Fig. 2 and into the positions shown in Fig. 3, and that if a length of hose 38 is resting in the trough formed by the member 37 of soft rubber, that such hose will be clamped between the members 36 and 37, as shown in Fig. 3. In order to maintain the angle supports 25 and the parts carried thereby in an uppermost position as shown in Fig. 3, I have provided on the shaft 22 adjacent one of the standards 15, a ratchet 39 which is adapted to be engaged by a pawl 40 and which will hold the shaft 22 against retrograde movement until the pawl 40 is released from the ratchet 39. The purpose of this device will be apparent as a description of the invention progresses.

41 designates, as a unit, a rectangular framework of which one of the elements is a channel iron 42. On the framework 41 and at each end thereof are arranged pairs of aligned bearings 43, in each pair of which is rotatably mounted a shaft 44. On each shaft 44 is secured a sprocket 45, the sprockets being in alignment with each other and over the sprockets runs an endless chain 46. The length of the frame 41 is approximately equal to the length of frame members 11 above described, and the channel iron 42 acts as a convenient reservoir for a plurality of lengths of hose 38 to be stripped from the mandrels 47 on which they are built. The upper reach of the endless chain 46 is substantially in horizontal alignment with the lower face of the resilient member 36 above described. Secured to one of the shafts 45 is a sprocket 47′ which is in alignment with a sprocket 48 on the drive shaft 49 of a motor 50 and over the sprockets 45 and 48 runs a sprocket chain 51. The usual means (not shown) is provided for controlling the motor 50 to drive the chain, the top reach of which travels in the direction of the arrow shown in Fig. 1. The framework 41 is spaced apart from the framework 11 as shown in Fig. 1 to provide a space for the workmen to manipulate the hose 38 and the various mechanisms constituting the stripping device. Assuming the length of a hose to be approximately 50 feet, then a convenient overall length for the combined mechanisms above described is approximately 110 feet.

Secured to one end of the channel irons 16 is a breaker roll mechanism composed of a pair of side plates 52 arranged parallel to and spaced apart from each other and at the lower end of the side plates are aligned bearings 53. Rotatably mounted in such aligned bearings is a shaft 54 and secured to such shaft between the bearings 53 is a breaker roll 55, the periphery of which is concaved as indicated at 56. Secured to the shaft 54 and adjacent one of the bearings 53 is a gear 57. Each of the side plates above the bearings 53 is provided with a slideway 58. The slideway in each of the side plates 52 is bridged by a bar 59. Slidably mounted in the slideway 58 are bearing blocks 60 and in the bearing blocks 60 is rotatably mounted a shaft 61. Secured to one of the bearing blocks 60, but rotatable with respect thereto is a threaded shaft 62 which is threaded through a hole in its associated cross bar 59. Secured to the other bearing block 60 and rotatable with respect thereto is a threaded shaft 63 similar to the shaft 62. This shaft 63 is likewise threaded through its associated cross bar 59. Secured to the shafts 62 and 63 above the cross bars 59 are sprockets 64 and over these sprockets run the endless sprocket chain 65. Secured to the upper end of the shafts 62 is a hand wheel 66 and by means of which the shaft 62 and 63 may be simultaneously rotated to either raise or lower the bearing blocks 60 in the slideways 58. To the shaft 61 between the bearing blocks 60 is secured a breaker roll 67, the periphery of which is concaved as indicated at 68 and which is associated with the concave periphery 56 of the breaker roll 55. Also secured to the shaft 61 adjacent one of the bearing blocks 60 is a gear 69. In the side plate 52 adjacent to the gears 57 and 69 are shafts 70 and 71, and on these shafts are rotatably mounted gears 72 and 73, respectively. The gears 72 and 73 mesh with each other as shown in Fig. 5 and the gear 72 meshes with the gear 57 while the gear 73 meshes with the gear 69. Also on the side plate 52 above referred to is arranged a shaft 74 on which is rotatably mounted a pinion 75 which meshes with and drives the gear 72 and, therefore, the train of gears 72, 73, 57 and 69. Secured to the pinion 75 in any convenient manner is a pulley 76 over which runs a belt 77 leading from any suitable source of power and by means of which the train of gears above described may be operated. This train of gears is so arranged that the gear 69 will always remain in mesh with the gear 73, regardless of the amount of movement of the shaft 61, and also the gears 57 and 69 rotate in the direction of the arrow shown thereon in Fig. 5 so that a length of hose 38 fed between the breaker rolls 56 and 68 will be fed into the trough formed by the channel iron 16.

The lengths of hose 38 as they come from the vulcanizers are placed in the trough formed by the channel iron 42, and from this trough they are fed successively between the breaker rolls 68 and 56 where they are deposited by said rolls in the trough formed by the channel iron 16. With a workman at each end of the framework 11, they reach up into the trough formed by the channel iron 16 and lift one of the lengths of hose 38 therefrom and deposit the same on the long leg 29 of the angle carried by the angle supports 25, the long leg 29 assisting in guiding the length of hose 38 into the position shown in Fig. 2. As the length of hose 38 passes through the breaker rolls 58 and 68, the hose is distorted as will be apparent from an inspection of Fig. 4, and this distorting action tends to break away the inner tube thereof from the mandrel 47. After the length of hose 38 is placed in the position shown in Fig. 2, an operator by controlling the flow of fluid under pressure through the pipe line 33 causes the upward movement of the shaft or piston rods 24, thus carrying the angle supports 25 and the length of hose 38 supported thereby into the position shown in Fig. 3, where it will be obvious that the length of hose 38 is resiliently clamped between the soft rubber member 37 and the sponge rubber member 36. In order that the pressure exerted on the length of hose 38 may be uniform throughout, and regardless of the presence or absence of the mandrel 37 in any portion thereof, the operator will, when the parts reach the position shown in Fig. 3, allow the pawl 40 to come into engagement with the ratchet 39, thus preventing any further rotative movement on the part of the shaft 21 and thereby preventing any further movement of the angle brackets 25 with respect to the members 35 and 36. There is always left about three inches of the mandrel 47 uncovered by the hose 38 as clearly shown in Fig. 7 and the operator will now take a pair of tongs or a "come-a-long" 78 attached to a hook 79 and will place the hooked end thereof between adjacent links on the endless chain 46, which it will be seen is in motion, with the upper reach moving in the direction of the arrow shown in Fig. 1. The length of hose 38 being held as above described, the mandrel 47 will be withdrawn therefrom and in practice this withdrawal takes place at the rate of approximately 100 feet per minute. After the mandrel 47 is removed, it is sent back to the hose making mill and the hose 38, from which the mandrel has been removed, is sent to its proper place and the above operation may be repeated indefinitely.

Having thus described my invention what

I claim and desire to protect by Letters Patent is:

1. That improved method of stripping hose from a mandrel during the manufacture thereof, which consists in compressing and distorting the hose progressively throughout its length to break the same loose from the mandrel, holding the hose throughout its length on the extremities of a diameter and withdrawing the mandrel from the interior of the hose.

2. That improved method of stripping hose from a mandrel on which the hose has been built, which consists in breaking the hose loose from the mandrel and subsequently retaining the hose under a compressive action while withdrawing the mandrel.

3. That improved method of stripping hose from a mandrel on which the hose has been built, which consists in breaking the hose loose from the mandrel and subsequently retaining the hose under a compressive action throughout its length and simultaneously withdrawing the mandrel.

4. In a machine for stripping hose from a mandrel, the combination of means for breaking the hose loose from the mandrel, means for compressing and retaining the hose and means for withdrawing the mandrel while so held.

5. In a machine for stripping hose from a mandrel, the combination of a pair of rotatable breaker rolls for progressively breaking a hose loose from a mandrel, a pair of clamping members for holding a length of hose under compression throughout its length, a gripping device for gripping an end of the mandrel and means for moving the gripping device for withdrawing the mandrel from the hose.

6. In a machine for stripping hose from a mandrel, the combination of means for breaking the hose loose, a pair of breaker rolls, means for rotating the same to progressively break the hose loose from a mandrel, a pair of clamping members for holding a length of hose under compression throughout its length, means for locking the clamping members in clamping position, a gripping device for gripping an end of the mandrel and means for moving the gripping device for withdrawing the mandrel from the hose.

7. In a machine for stripping hose from a mandrel, the combination of a pair of breaker rolls, means for rotating the same to progressively break the hose loose from a mandrel, a pair of parallelly arranged clamping members for holding a length of hose under compression throughout its length, means for locking the clamping members in clamping position, a gripping device for gripping an end of the mandrel and means for moving the gripping device for withdrawing the mandrel from the hose.

8. In a machine for stripping hose from a mandrel, the combination of a pair of breaker rolls, means for rotating the same to progressively break the hose loose from a mandrel, means for rotating the same for holding a length of hose under compression throughout its length, means for moving the clamping members into clamping position, means for locking the clamping members in clamping position, a gripping device for gripping an end of the mandrel and an endless chain for moving the gripping device for withdrawing the mandrel from the hose.

Signed at Passaic, county of Passaic, State of New Jersey, this 31st day of July, 1931.

NATHANIEL H. CURTISS.